March 3, 1953 J. T. NEISWINTER 2,630,493
CARRIER TELEGRAPH SYSTEM
Filed July 10, 1951 2 SHEETS—SHEET 1

INVENTOR
J. T. NEISWINTER
BY H. A. Burgess
ATTORNEY

INVENTOR
J. T. NEISWINTER
BY H. A. Burgess
ATTORNEY

Patented Mar. 3, 1953 2,630,493

UNITED STATES PATENT OFFICE 2,630,493

CARRIER TELEGRAPH SYSTEM

James T. Neiswinter, Garden City, N. Y., assignor to American Telephone and Telegraph Company, a corporation of New York Application July 10, 1951, Serial No. 235,936

8 Claims. (Cl. 178—51)

This invention relates to multichannel carrier telegraph systems, more particularly to such systems utilizing separate pairs for the opposite directions of transmission.

An object of the invention is to facilitate the connection of intermediate stations to a main telegraph line without interfering with the through transmission of telegraph signals between stations on the main line.

Another object of the invention is to bridge an intermediate station onto a four-wire telegraph line by means of a balanced network, which effectively isolates the opposite directions of carrier telegraph transmission.

A feature of the invention is the bridging connection of an intermediate station to a main telegraph line which obviates the necessity of converting from the carrier frequencies to direct-current telegraph signals and conversely for the through signals.

Another feature of the invention is the bridging of an intermediate station by means of balanced coils onto a main telegraph line consisting of two pairs for the opposite directions of transmission.

Another feature of the invention is an intermediate carrier telegraph station bridged across two pairs of conductors by means of a bridge of four pairs of terminating coils whereby transmission and reception from intermediate stations to stations spaced along the main line is accomplished without the intermediate station equipment interfering with through telegraph communication.

Another feature of the invention is the bridging of an intermediate station onto a main telegraph line by a balanced arrangement of terminating coils to eliminate the need of channel filters usually present in the main line.

Another feature of the invention is a channel shifter at an intermediate, bridged station for transforming one channel or channel frequency into another, whereby a main line channel of one frequency can be connected to a side leg channel of a different frequency.

In accordance with a specific embodiment of the invention, an intermediate telegraph carrier station is bridged across a main telegraph line by a bridging arrangement of balanced coils, whereby the intermediate station may send to or receive from any stations along the main line without causing transmission impairment to telegraph traffic along the main line. A carrier signal received from the main line divides equally in the bridging arrangement, one half being dissipated in the output of an isolating amplifier, and the other half being suitably amplified and directed to the carrier channel equipment. The bridging arrangement by virtue of its high degree of balance effectively isolates the two directions of transmission on the main line.

Referring to the figures of the drawing.

Figures 1, 2:
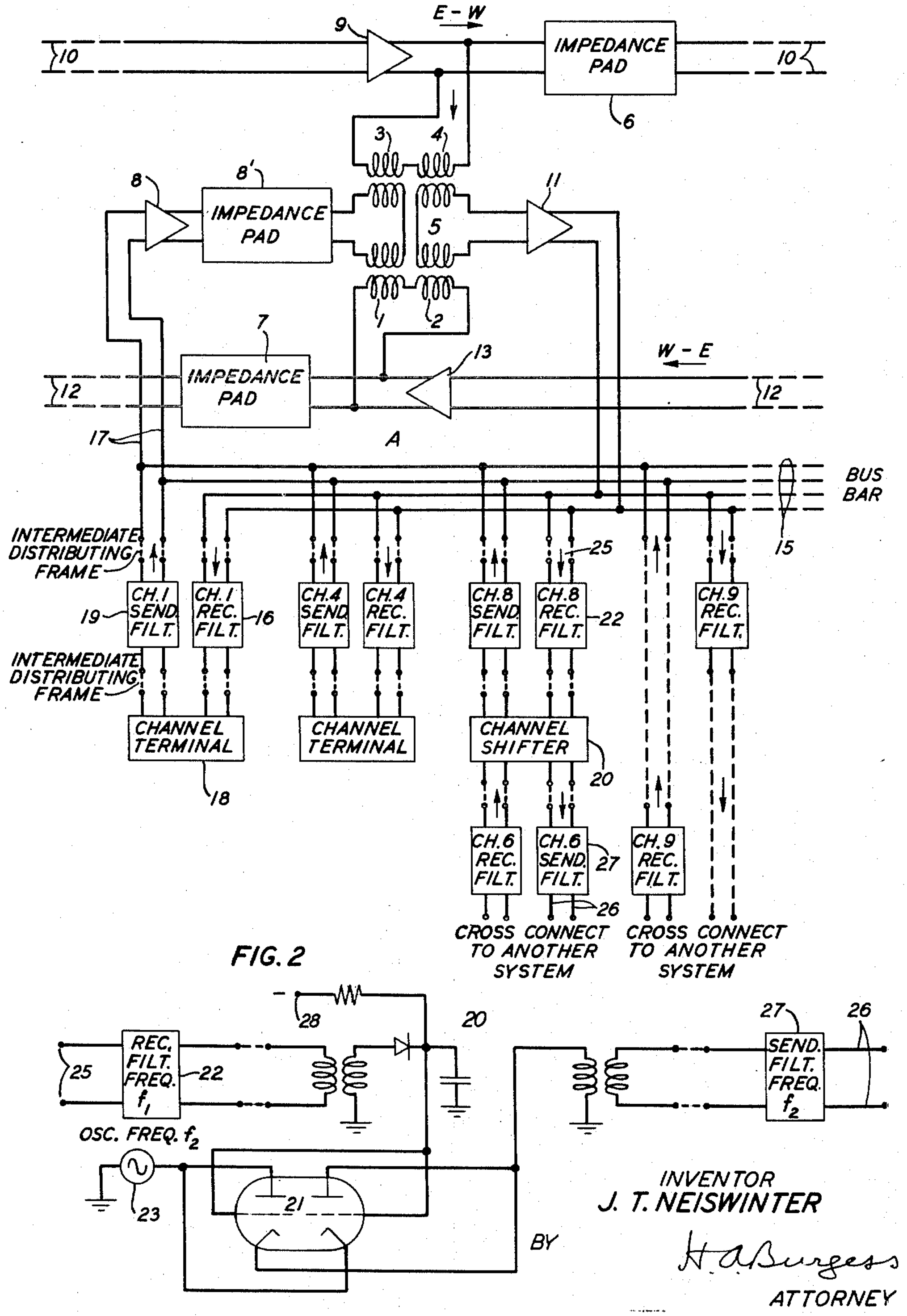
Fig. 1 shows an intermediate station bridged across the main line of a multichannel carrier telegraph system in accordance with the invention.
Fig. 2 shows a frequency converter circuit utilized as a channel shifter in the intermediate station.

Referring to Fig. 1 of the drawing, a multichannel carrier frequency telegraph system is represented, utilizing a pair 10 constituting the east-west line and a pair 12 for the west-east direction of signal propagation.

An intermediate station A is bridged across the pairs 10, 12 representing the main telegraph line by a balanced arrangement of coils which avoids the conventional conversion, for through signals, of carrier into direct-current telegraph signals and vice versa. Substantial economies in cost and improvement in transmission of through signals are thereby obtained by the bridging system of the present invention.

The balanced coil arrangement 5 in conjunction with the transmitting and receiving amplifiers 8 and 11, respectively, permits the station A to be bridged onto the E–W and W–E lines, so that the customer at station A can transmit and receive signals to and from either direction without his carrier equipment impairing telegraph communications between main line stations.

Specifically, the bridging connection for the station A is achieved by means of the four coils 1, 2, 3, and 4 which are arranged as shown in a bridge and are analogous to the hybrid coils located at the terminals of four-wire telephone circuits to convert the four-wire section of the circuit to a two-wire operation.

The general principle of the coupling coil arrangement is such that current entering the network 5 from any branch is transmitted to the branch to the left and to the right of the entering branch but is not transmitted across the network to the opposite branch. The lack of transmission across the network to the opposite branch is dependent upon the impedance of the branch to the left of the entering branch being equal to the impedance of the branch to the right of the entering branch. Any deviation from equality between these two branches will result in current flowing directly across the network, the amount of current being proportional to the unbalance between the left and right branch. In practice the balance between these two branches can be made so nearly equal that the transmission loss directly across the network is in the order of 60 decibels or more. The impedance pad 6 improves the impedance of the line circuit 10 into which line amplifier 9 is transmitting. The pad 7 improves the impedance of the line circuit 12 into which the line amplifier 13 is transmitting. All pads 6, 7, and 8' increase the degree of balance obtained between opposite branches of the bridging coils 1, 2, 3, and 4.

The main line carrier telegraph communications and the equipment at the intermediate office are operated on the basis of carrier being transmitted for space and no carrier being transmitted for mark.

The operation of the bridge circuit is as follows:

The customer in a distant city to the left of the intermediate office is assumed to have sent a carrier tone for the "spacing" signal along line 10 on a particular channel. This tone, will pass through the intermediate office and on to the distant city to the right without having passed through any channel filters at the intermediate office. In this respect, the bridging arrangement provides advantages over conventional systems which require a receive and send channel filter at each intermediate station.

The tone incoming from the left also passes down into the bridging arrangement. Here the tone divides, half going to the left where it is dissipated in the output circuit of the amplifier 8, and half going to the right where it is amplified by the amplifier 11 and passes down to a common bus-bar 15, for all channel frequencies. Here the particular carrier frequency under consideration passes through the channel 1 receive filter 16 tuned to this frequency and reaches the channel terminal equipment 18 where it is rectified and caused to operate the receive relay (not shown) in the channel terminal. Substantially no carrier frequency current passes directly across the bridge circuit 5 from top to bottom.

Similarly, if a customer in a distant city to the right of the intermediate office A, transmits a carrier tone of the same frequency on line 12 this tone will also pass via amplifier 13, network 5, amplifier 11, bus-bar 15 and it will be received in filter 16 of channel 1. In the bridge circuit 5, the carrier tone from west-east incoming on pair 12 divides, half going to the left as heretofore described, and half going to the right, the half going to the right being amplified in amplifier 11, fed to the common receiving bus-bar 15, and passing through the same receiving filter 16 to reach the channel terminal 18 and cause the operation of the receiving relay in this equipment. Thus it has been shown that the customer bridged onto the carrier telegraph system at an intermediate point A can receive signals from either direction on the main telegraph line of the carrier system and at the same time the bridging arrangement will cause no impairment to signals passing through the intermediate office.

*Transmitting from intermediate station*

When the customer at the intermediate office sends a spacing signal, the resulting carrier frequency is transmitted through send filter 19, over path 17 and through the amplifier 8 onto the bridge circuit 5, where it divides equally, half going up to the line 10 transmitting towards the right (W) and half going down to the line 12 transmitting towards the left. Therefore the carrier current produced by the intermediate customer in sending a space signal will be transmitted to both sides of the main line 10, 12 and will be propagated both to the left and right of the intermediate office A to reach distant customers to the left and right. At the bridge circuit, only a very small amount of carrier current is transmitted horizontally across the bridge because of the balance between the upper and lower legs, the amount being transmitted being insufficient to operate the receiving equipment of the intermediate customer.

It is also possible, where an intermediate customer may be in the order of fifty miles or more from the intermediate office A, to transmit the carrier frequency tapped off the main line circuit as heretofore described to the distant intermediate customer over a channel of another carrier telegraph system. This is illustrated in channel 8 of Fig. 1 and requires that on the second carrier telegraph system the frequency space allotted to the particular frequency being tapped off the main line carrier system not be in use. In the cases where this frequency space will be in use, it is possible to take the carrier frequency tapped off the main line circuit and pass it through a channel shifter 20 which will transmit at a different frequency carrier current, this different carrier frequency being predetermined to be one for which frequency space on the second carrier system is available. In this case, since the frequency will be received from the distant intermediate customer, it will be necessary to employ another frequency changer to change the carrier frequency received from him to the carrier frequency employed on the main line circuit for this particular service.

The specific channel shifter circuit 20 is shown in Fig. 2.

The received carrier frequency $f_1$, which, for example, characterizes channel 8 shown in Fig. 1, is tapped off the main line by receiving filter 22 and passed through control tube 21, which passes frequency $f_2$ to the send filter 27 whenever frequency $f_1$ is received from the receive filter 22.

The tube 21 is normally biased to cut off by the negative potential at terminal 28 and is activated by the rectified carrier potential of frequency $f_1$, when it appears on line 25 allowing frequency $f_2$ from the oscillator 23 to pass to the send filter 27.

Figure 3:
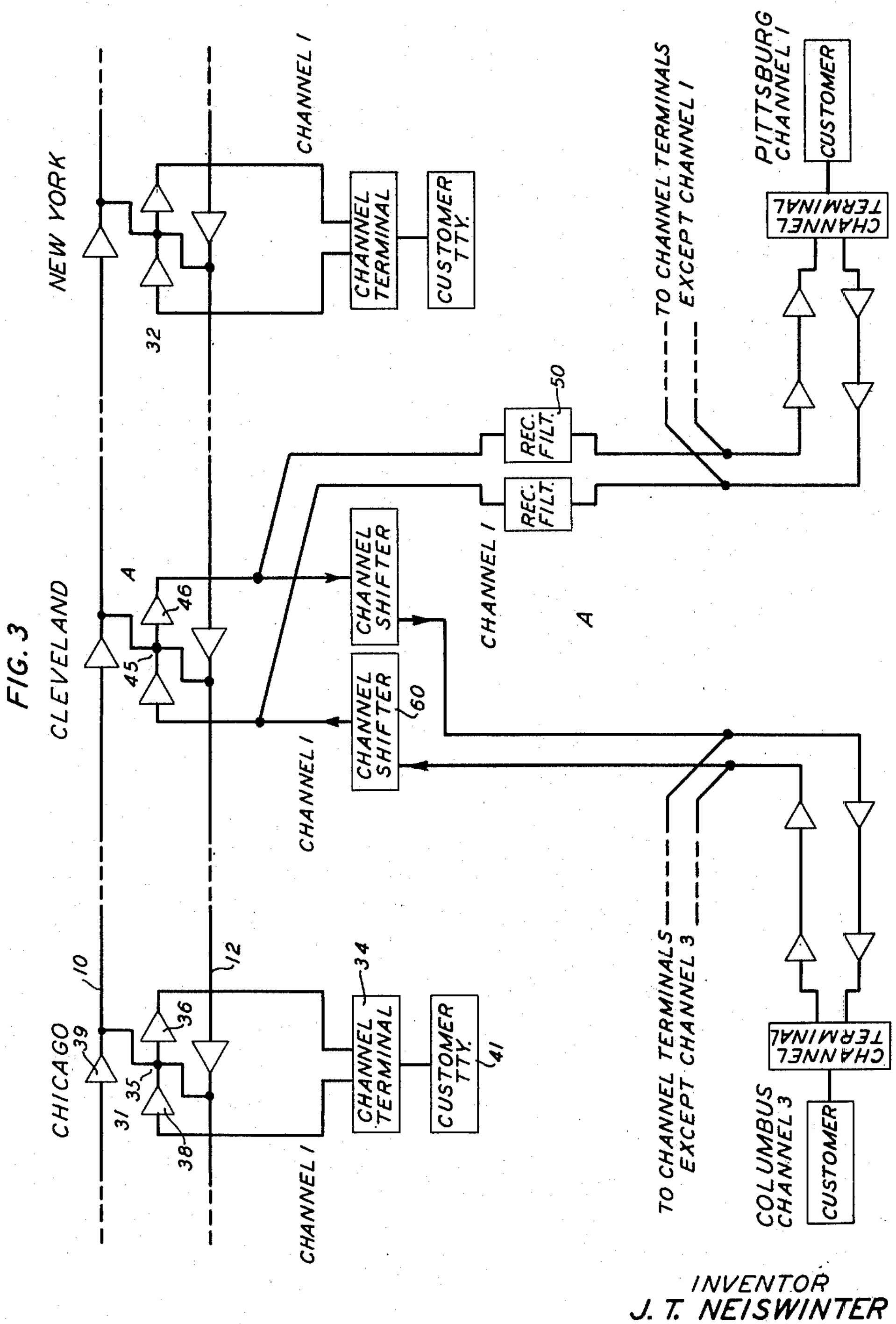
Fig. 3 shows a block schematic of a complete carrier telegraph system in accordance with the invention.

Referring to the circuit of Fig. 3, this shows stations 31 and 32 on the main lines 10 and 12 and an intermediate station A bridged onto the main line as described previously.

Signals from points west of Chicago on the circuit 10 arrive from the left on the main line circuit and will pass through the amplifier 39 and continue on to New York. In addition, a portion of the signal at the output of the amplifier 39 at Chicago is tapped off by the bridge circuit 35. The portion of the signal entering the bridge circuit divides in the usual manner into two parts, one part passing to the left where it is dissipated in the output of the amplifier 38 and the other part passing to the right where it is amplified by amplifier 36 and passed to the channel terminal where it is rectified to operate the relay of the customer's teletypewriter 41. If the bridge circuit is balanced perfectly, no currents will pass directly across the bridge and thus no current, or, in the practical case, only a negligible amount of carrier current will reach the other side of the main line of the circuit to be transmitted back to the sender. At the other points on the main line such as at stations 32 at New York, the same action takes place, the signal at the output of the west-to-east amplifier being tapped off into the bridge circuit where it is then applied through an amplifier to the channel terminal and the customer's teletypewriter.

A similar action occurs for the opposite direction of transmission on the main line 12 of the telegraph circuit so that signals from New York will reach all customers on the circuit via the bridge circuit at each intermediate office. Since carrier current is present on the circuit only when a customer is sending, the customers who are not sending will not cause any interference to the customer who is.

At intermediate stations A such as at Cleveland, signals from either direction are applied to a bridge circuit 45 but the output of the right-hand bridge amplifier 46 is applied through a receiving filter to a V. F. channel to Pittsburgh on which the channel 1 frequency space has been assigned for this use. At Cleveland also an arrangement is shown for connecting the main line of the circuit to a channel to Columbus where the frequency space for channel 1 is already in use and the frequency space for channel 3 is available.

In this case it is necessary to apply the channel 1 frequency to a channel shifter circuit as shown on Figs. 1 and 2, which is arranged to send out a channel 3 frequency whenever a channel 1 frequency is applied to its input.

In the case of transmission from a customer, such as at Chicago, signals from the customer's teletypewriter are converted to carrier current frequencies in the channel terminal 34 and applied through the left-hand amplifier 38 of the bridge circuit to the bridge circuit itself. In the bridge circuit the carrier current makes the usual division into the left and right branches (in this case the upper and lower branches) with practically no current going directly across the bridge since the bridge is assumed to be balanced. The current going into the upper branch is applied to the west-to-east direction of the main line of the circuit and goes on to Cleveland and New York. The current which passes to the lower branch is applied to the east-to-west direction and goes on to points west. Signals arriving from Pittsburgh at Cleveland are applied directly to the bridge for similar connection to the main line, while signals arriving from Columbus on channel 3 in this case are converted to channel 1 frequency by the channel shifter before being applied to the bridge circuit.

An important feature of the present system is that signals between any two offices on the system are unimpaired by equipment used for connecting on an intermediate office, since this equipment is only bridged to the circuit and any loss it causes is made up by additional gain in the amplifier on the main line.

It should be apparent to those skilled in the art that various modifications may be made in the system without departing from the spirit of the invention. While a bridging network of balanced coils has been disclosed, it should be understood that bridging resistors and transpositions may be employed of the type shown, for example in United States Patent 2,035,536 issued March 31, 1936 to Frank A. Cowan and G. J. Goetz.

What is claimed is:

1. A carrier telegraph system comprising terminal stations, individual lines for transmitting carrier telegraph signals between said stations in opposite directions, an intermediate station bridged across said lines, a sender and receiver in each intermediate station operating on a common frequency and balanced terminating coils coupling said intermediate station to said lines whereby transmission between intermediate station and terminals is effected without the intermediate equipment impairing through transmission.

2. In a telegraph system, an E-W line transmitting multichannel carrier currents, a W-E line transmitting multichannel carrier currents, an intermediate station bridged across said lines, said station comprising channel send and channel receive filters and corresponding channel terminals connected thereto respectively, a balanced coupling between said intermediate station and said lines, said coupling comprising pairs of coils serially connected together, each pair associated with a corresponding line, and a network comprising coils connected to said filters and coupled to said serially connected coils whereby transmission between said main line and intermediate station is effected.

3. The structure of claim 2, and a channel shifter connected to a channel filter, said shifter comprising a modulator adapted to convert one channel frequency into another.

4. The structure of claim 2, and a channel shifter connected to a channel filter, said shifter comprising a biased modulator, and selective means for activating said modulator upon receipt of the corresponding carrier.

5. The structure of claim 2, and a channel frequency converter comprising a negatively biased modulator adapted to be cut off by said bias and a rectifier connected to the corresponding channel filter for overcoming the bias and a source of fixed frequency connected to said modulator.

6. In a telegraph system, a pair of conductors transmitting carrier currents in a plurality of frequency ranges, a pair of conductors transmitting carrier currents in a plurality of ranges in the opposite direction, an intermediate station comprising multichannel receiving and sending filters bridged across said lines by pairs of balanced coils, a transmitting amplifier connected to one pair and a receiving amplifier connected to the other pair, and a resistance pad in the output of the transmitting amplifier for improving the balance across the coil network.

7. The structure of claim 6, and channel terminals connected to said filters.

8. The structure of claim 6, and channel shifters comprising frequency converting modulators connected to said filters and selective means connected to said modulators for selecting the converted frequency.

JAMES T. NEISWINTER.

REFERENCES CITED

The following references are of record in the file of this patent:

UNITED STATES PATENTS

| Number | Name | Date |
|---|---|---|
| 1,728,978 | Parker | Sept. 24, 1929 |

FOREIGN PATENTS

| Number | Country | Date |
|---|---|---|
| 166,662 | Great Britain | July 14, 1921 |